(12) United States Patent
Golov et al.

(10) Patent No.: US 9,058,288 B2
(45) Date of Patent: Jun. 16, 2015

(54) REDUNDANT STORAGE IN NON-VOLATILE MEMORY BY STORING REDUNDANCY INFORMATION IN VOLATILE MEMORY

(75) Inventors: Oren Golov, Hod-Hasharon (IL); Oren Segal, Kfar Saba (IL); Uzi Doron, Tel Aviv (IL); Julian Vlaiko, Kfar Saba (IL); Avraham Meir, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 13/429,385

(22) Filed: Mar. 25, 2012

(65) Prior Publication Data

US 2012/0254694 A1 Oct. 4, 2012

Related U.S. Application Data

(60) Provisional application No. 61/471,148, filed on Apr. 3, 2011.

(51) Int. Cl.
*G06F 11/10* (2006.01)
*G06F 11/32* (2006.01)

(52) U.S. Cl.
CPC ........ *G06F 11/1044* (2013.01); *G06F 11/1076* (2013.01); *G06F 11/108* (2013.01)

(58) Field of Classification Search
CPC ............ G06F 11/1076; G06F 11/1008; G06F 11/1068; G06F 11/1072; G06F 11/1044; G06F 11/108; H03M 13/09; H04L 1/0061; H04L 1/0057
See application file for complete search history.

(56) References Cited

U.S. PATENT DOCUMENTS

| | | | |
|---|---|---|---|
| 8,069,307 B2 | 11/2011 | Cornwell et al. | |
| 8,381,075 B2 | 2/2013 | Toops et al. | |
| 8,700,951 B1 * | 4/2014 | Call et al. | 714/6.24 |
| 2004/0103238 A1 * | 5/2004 | Avraham et al. | 711/102 |
| 2007/0206418 A1 | 9/2007 | Kozakai et al. | |
| 2008/0065937 A1 | 3/2008 | Micheloni et al. | |
| 2008/0184067 A1 * | 7/2008 | Ito | 714/6 |
| 2009/0187786 A1 * | 7/2009 | Jones et al. | 714/7 |
| 2010/0169743 A1 * | 7/2010 | Vogan et al. | 714/773 |
| 2010/0274952 A1 * | 10/2010 | Lee | 711/103 |
| 2010/0318844 A1 * | 12/2010 | Matsuda et al. | 714/6 |
| 2012/0317356 A1 * | 12/2012 | Ignatowski | 711/114 |

* cited by examiner

*Primary Examiner* — April Y Blair
*Assistant Examiner* — Dipakkumar Gandhi
(74) *Attorney, Agent, or Firm* — Meyertons, Hood, Kivlin, Kowert & Goetzel, P.C.; Erik A. Heter

(57) ABSTRACT

A method for data storage includes storing two or more data items in a non-volatile memory. Redundancy information is calculated over the data items, and the redundancy information is stored in a volatile memory. Upon a failure to retrieve a data item from the non-volatile memory, the data item is reconstructed from remaining data items stored in the non-volatile memory and from the redundancy information stored in the volatile memory.

27 Claims, 2 Drawing Sheets

REDUNDANT STORAGE IN NON-VOLATILE MEMORY BY STORING REDUNDANCY INFORMATION IN VOLATILE MEMORY

CROSS-REFERENCE TO RELATED APPLICATIONS

This application claims the benefit of U.S. Provisional Patent Application 61/471,148, filed Apr. 3, 2011, whose disclosure is incorporated herein by reference.

FIELD OF THE INVENTION

The present invention relates generally to memory systems, and particularly to methods and systems for redundant data storage.

BACKGROUND OF THE INVENTION

Some non-volatile memory systems store data in redundant configurations in order to increase storage reliability and reduce the likelihood of data loss. For example, U.S. Patent Application Publication 2010/0017650, whose disclosure is incorporated herein by reference, describes a non-volatile memory data storage system, which includes a host interface for communicating with an external host, and a main storage including a first plurality of Flash memory devices. Each memory device includes a second plurality of memory blocks. A third plurality of first stage controllers are coupled to the first plurality of Flash memory devices. A second stage controller is coupled to the host interface and the third plurality of first stage controller through an internal interface. The second stage controller is configured to perform Redundant Array of Independent Disks (RAID) operation for data recovery according to at least one parity.

As another example, U.S. Patent Application Publication 2009/0204872, whose disclosure is incorporated herein by reference, describes a Flash module having raw-NAND Flash memory chips accessed over a Physical-Block Address (PBA) bus by a controller. The controller converts logical block addresses to physical block addresses. In some embodiments, data can be arranged to provide redundant storage, which is similar to a RAID system, in order to improve system reliability.

SUMMARY OF THE INVENTION

An embodiment of the present invention that is described herein provides a method for data storage. The method includes storing two or more data items in a non-volatile memory. Redundancy information is calculated over the data items, and the redundancy information is stored in a volatile memory. Upon a failure to retrieve a data item from the non-volatile memory, the data item is reconstructed from remaining data items stored in the non-volatile memory and from the redundancy information stored in the volatile memory.

In some embodiments, calculating the redundancy information includes calculating an exclusive-OR (XOR) over the data items, and reconstructing the data item including calculating the XOR over the remaining data items and the redundancy information. In alternative embodiments, calculating the redundancy information including encoding the data items with an Error Correction Code (ECC).

In an embodiment, the data items are defined by respective physical storage locations in the non-volatile memory. Alternatively, the data items are defined by respective logical addresses that are mapped to respective physical storage locations in the non-volatile memory in accordance with a logical-to-physical address translation scheme.

In some embodiments, storing the redundancy information includes protecting the redundancy information stored in the volatile memory from interruption of electrical power supply. Protecting the redundancy information may include providing the electrical power supply to the volatile memory from a backup power source during at least part of the interruption. In another embodiment, protecting the redundancy information includes receiving an advance notification of the interruption, and initiating protection of the redundancy information in response to the notification. In yet another embodiment, protecting the redundancy information includes copying the redundancy information from the volatile memory to the non-volatile memory.

In a disclosed embodiment, calculating the redundancy information includes calculating first redundancy information over a first set of the data items, and calculating second redundancy information over a second set of the data items, such that a given data item belongs to both the first set and the second set, and reconstructing the given data item includes recovering the given data item using both the first and the second redundancy information. In an embodiment, storing the data items includes distributing the data items over multiple non-volatile memory devices.

In some embodiments, the volatile memory is external to a storage device that includes the non-volatile memory. In some embodiments, storing the redundancy information includes calculating parity bits over the redundancy information, and storing both the parity bits and the redundancy information in the volatile memory.

There is additionally provided, in accordance with an embodiment of the present invention, a data storage apparatus including a non-volatile memory and a processor. The processor is configured to store two or more data items in the non-volatile memory, to calculate redundancy information over the data items, to store the redundancy information in a volatile memory, and, upon a failure to retrieve a data item from the non-volatile memory, to reconstruct the data item from remaining data items stored in the non-volatile memory and from the redundancy information stored in the volatile memory.

There is also provided, in accordance with an embodiment of the present invention, a memory controller including an interface and a processor. The interface is configured to communicate with a non-volatile memory. The processor is configured to store two or more data items in the non-volatile memory, to calculate redundancy information over the data items, to store the redundancy information in a volatile memory, and, upon a failure to retrieve a data item from the non-volatile memory, to reconstruct the data item from remaining data items stored in the non-volatile memory and from the redundancy information stored in the volatile memory.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for redundant data storage. In the disclosed techniques, a memory controller stores data items on behalf of a host in a non-volatile memory, e.g., in an array of NAND Flash memory devices. In order to increase storage reliability, the memory controller calculates redundancy information over the data items.

Unlike the data items that are stored in non-volatile memory, the memory controller stores the redundancy information in a volatile memory, such as a Random Access Memory (RAM) device. Upon failing to retrieve a data item from the non-volatile memory, the memory controller reconstructs the failed data item from remaining data items that are stored in the non-volatile memory and from the redundancy information that is stored in the volatile memory.

Storing the redundancy information in volatile memory, rather than in non-volatile memory, provides important performance benefits. In many redundancy schemes, the redundancy information is written much more frequently than the data items. Since volatile memory is typically considerably faster than non-volatile memory, storing the redundancy information in the volatile memory reduces the overall data storage latency.

Moreover, non-volatile memory can typically endure a considerably smaller number of programming cycles in comparison with volatile memory, and its storage quality deteriorates with use. Therefore, the disclosed techniques increase the total memory lifetime and quality.

Furthermore, volatile memory can typically be re-programmed in place, i.e., existing values can simply be overwritten with new values. Non-volatile memory, on the other hand, should typically be erased prior to re-programming, and therefore storage in non-volatile memory involves complex management such as logical-to-physical address translation. Storing redundancy information in volatile memory simplifies the management tasks of the memory controller. The disclosed techniques also free non-volatile memory space, which can be used for storing additional user data or for providing higher over-provisioning overhead.

Several examples of memory systems that use the disclosed techniques are described hereinbelow. In one embodiment, a Solid State Drive (SSD) comprises an array of Flash devices and a Dynamic RAM (DRAM) that is used for storing management-related information. The SSD controller stores data in the Flash devices, and allocates a region in the DRAM for storing the corresponding redundancy information. Several techniques for protecting the redundancy information in the volatile memory against loss of electrical power are also described.

System Description

Figure 1:
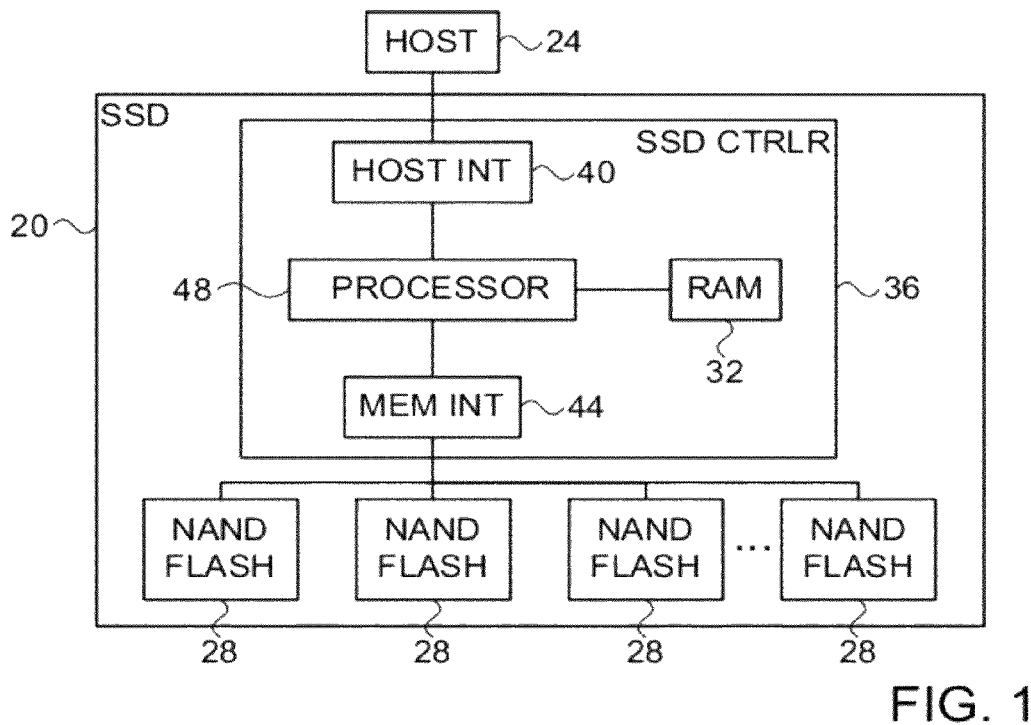
FIG. 1 is a block diagram that schematically illustrates a memory system, in accordance with an embodiment of the present invention.

FIG. 1 is a block diagram that schematically illustrates a Solid State Drive (SSD) 20, in accordance with an embodiment of the present invention. SSD 20 stores data on behalf of a host 24. For example, SSD 20 may be installed in a mobile or personal computer, in which case host 24 comprises a Central Processing Unit (CPU) chipset of the computer. Alternatively, SSD 20 may be used with any other suitable host. Although the embodiments described herein refer mainly to SSD, the disclosed techniques can be used with various other kinds of memory systems, such as enterprise storage devices, mobile phones, digital cameras, mobile computing devices such as laptop computers, tablet computers or Personal Digital Assistants (PDAs), media players, removable memory cards or devices, or any other suitable memory system.

SSD 20 stores data on behalf of host 24 in a non-volatile memory, in the present example in one or more NAND Flash memory devices 28. In alternative embodiments, the non-volatile memory in SSD 20 may comprise any other suitable type of non-volatile memory, such as, for example, NOR Flash, Charge Trap Flash (CTF), Phase Change RAM (PRAM), Magnetoresistive RAM (MRAM) or Ferroelectric RAM (FeRAM).

An SSD controller 36 performs the various storage and management tasks of the SSD, and in particular carries out redundant storage schemes that are described below. The SSD controller is also referred to generally as a memory controller. SSD controller 36 comprises a host interface 40 for communicating with host 24, a memory interface 44 for communicating with Flash devices 28, and a processor 48 that carries out the methods described herein.

SSD 20 further comprises a volatile memory, in the present example a Random Access Memory (RAM) 32. In the embodiment of FIG. 1 RAM 32 is shown as part of SSD controller 36, although the RAM may alternatively be separate from the SSD controller. In various embodiments, the volatile memory in SSD 20 may comprise any suitable type of volatile memory, such as, for example, Dynamic RAM (DRAM), Double Data Rate DRAM (DDR DRAM) or Static RAM (SRAM).

In the present context, the term "volatile memory" refers to memory media in which the stored data is lost in the absence of electrical power. The term "non-volatile memory" refers to memory media that retain the stored data in the absence of electrical power. The classification of a memory as volatile or non-volatile refers to the physical media of the memory and not to ancillary circuitry around it. Thus, for example, a battery-backed DRAM is still regarded as volatile memory even though it is protected from external power interruption by ancillary circuitry.

SSD controller 36, and in particular processor 48, may be implemented in hardware. Alternatively, the SSD controller may comprise a microprocessor that runs suitable software, or a combination of hardware and software elements.

The configuration of FIG. 1 is an exemplary configuration, which is shown purely for the sake of conceptual clarity. Any other suitable SSD or other memory system configuration can also be used. Elements that are not necessary for understanding the principles of the present invention, such as various interfaces, addressing circuits, timing and sequencing circuits and debugging circuits, have been omitted from the figure for clarity. In some applications, e.g., non-SSD applications, the functions of SSD controller 36 are carried out by a suitable memory controller.

In the exemplary system configuration shown in FIG. 1, memory devices 28 and SSD controller 48 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 28 are disposed. Further alternatively, some or all of the functionality of SSD controller 36 can be implemented in software and carried out by a processor or other element of host 24. In some embodiments, host 24 and SSD controller 36 may be fabricated on the same die, or on separate dies in the same device package.

In some embodiments, SSD controller 36 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Redundant Storage with Redundancy Information Stored in Volatile Memory

In some embodiments, SSD controller 36 stores data in the SSD using a redundant storage scheme that increases the storage reliability and protects the stored data against failures. In these embodiments, processor 48 defines a set of data items as a parity group, computes redundancy information over the data items in the parity group, stores the data items in the non-volatile memory (in the present example in Flash devices 28) and stores the redundancy information in the volatile memory (in the present example in RAM 32).

In the embodiments described herein, each data item comprises a data page, i.e., a unit of data that is written or read in a single write or read operation in a Flash device. In alternative embodiments, however, the data items may comprise any other suitable units of data of any desired type and size. Each data item may comprise, for example, an erasure block (also referred to as memory block) that is erased in a single erasure command in a Flash device. The data items may be defined by respective physical storage locations in the non-volatile memory (e.g., physical pages or physical memory blocks). Alternatively, when SSD controller stores the data using a logical-to-physical address translation, the data items may be defined by respective logical addresses (e.g., Logical Block Addresses—LBAs).

In the embodiments described herein, the redundancy information of a parity group comprises a bitwise exclusive-OR (XOR) that is performed over the data items in the parity group. The size of the redundancy information in these embodiments is the size of a single data item. This sort of redundancy information enables recovery from loss of a single data item. In alternative embodiments, processor 48 may calculate any other suitable type of redundancy information over the data items of a parity group. The redundancy information may be calculated, for example, using a suitable Error Correction Code (ECC), such as a Low Density Parity Check (LDPC) code, or using a suitable Redundant Array of Inexpensive Disks (RAID) scheme. Some types of redundancy information enable recovery from loss of multiple data items.

For a given parity group, processor 48 typically stores the data items in Flash devices 28, and stores the redundancy information in RAM 32. Typically, although not necessarily, processor 48 stores each data item in a different Flash device, or at least distributes the data items over multiple Flash devices. This technique reduces the likelihood that multiple data items in the same parity group will be affected by Flash device failure.

(The ability to distribute the different data items of a given parity group in different devices 28 depends on the size of the group and the number of devices 28. When RAM 32 is small, each parity group will typically comprise a large number of data items. In such a case, unless the number of devices 28 is at least as large, it will not be possible to distribute the data items without storing two or more of them in the same die. However, it is possible for processor 48 to minimize the number of data items of a given parity group that are stored in each device 28. For example, this number may be kept to no more than two.)

Storing the redundancy information in RAM 32, as opposed to Flash devices 28, is beneficial for several reasons. In many redundancy schemes, the redundancy information is written much more frequently than the data items (typically by a factor that depends on the size of the parity group). Since RAM 32 is typically considerably faster than Flash devices 28, storing the redundancy information in the RAM reduces the overall data storage latency of the SSD. Moreover, Flash devices 28 can typically endure a considerably smaller number of programming cycles in comparison with RAM 32, and the storage quality of Flash devices 28 deteriorates with cycling. Therefore, storing the redundancy information in RAM 32 increases the total SSD lifetime and quality.

Furthermore, RAM 32 can typically be re-programmed in place. Memory blocks in Flash devices 28, on the other hand, should typically be erased prior to re-programming. SSD controller 36 typically performs complex management tasks, including logical-to-physical address translation, for storing data in Flash devices 28. Such management is sometimes referred to as Flash management or Flash Translation Layer (FTL). Storing the redundancy information in RAM 32 simplifies the management tasks of the SSD controller. In addition, storing the redundancy information in RAM 32 frees memory space in Flash device 28. This extra memory space can be used for storing additional data items or for providing higher over-provisioning overhead (and thus increased programming throughput).

Figure 2:
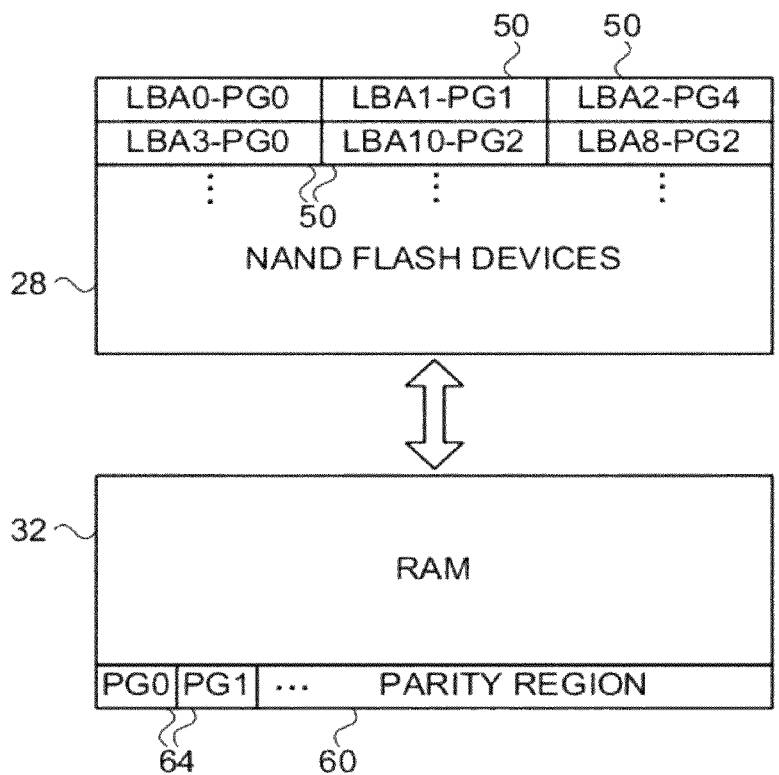
FIG. 2 is a diagram that schematically illustrates a redundant storage scheme that stores data in non-volatile memory and redundancy information in volatile memory, in accordance with an embodiment of the present invention.

Since RAM devices tend to be more expensive than Flash devices, it is typically desirable to keep the RAM memory size considerably smaller than the Flash memory size when carrying out the disclosed techniques. In an example embodiment, the ratio between RAM and Flash memory sizes is on the order of 1:1000, although any other suitable ratio can also be used. The ratio between FIG. 2 is a diagram that schematically illustrates a redundant storage scheme that stores data in non-volatile memory and redundancy information in volatile memory, in accordance with an embodiment of the present invention. In this example, the data items comprise LBAs 50, denoted LBA0, LBA1, . . . , which are stored in Flash devices 28. The LBAs are divided into parity groups denoted PG0,PG1, . . . . As shown in the figure, each LBA is associated with a certain parity group.

In some embodiments, processor 48 defines a parity region 60 in RAM 32. Processor 48 uses the parity region for storing redundancy information 64 for the various parity groups. In the present example, redundancy information 64 denoted PG0 comprises a bitwise XOR over LBAs 50 belonging to parity group PG0, the redundancy information denoted PG1 comprises a bitwise XOR over the LBAs belonging to parity group PG1, and so on. Typically, the memory space in RAM 32 outside parity region 60 is used by processor 48 for other purposes, e.g., for other management tasks of the SSD.

Typically, the available size of parity region 60 determines the extent of redundancy that can be offered, e.g., the number of data items per parity group. A large parity region enables smaller parity groups (and therefore enhanced protection), and vice versa.

In the example of FIG. 2, in each parity group the redundancy information is calculated over a respective set of LBAs. In other words, the data items in each parity group are identified by their logical addresses. In alternative embodiments, the data items in each parity group may be identified by their physical addresses, i.e., their physical storage locations in devices 28.

Redundant Storage and Retrieval Methods

Figure 3:
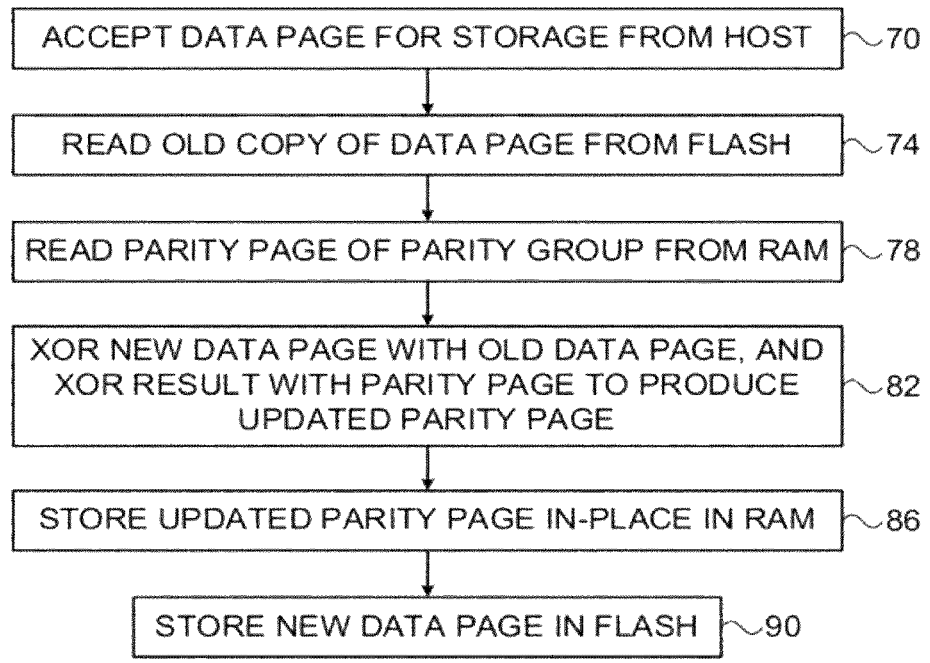
FIG. 3 is a flow chart that schematically illustrates a method for redundant data storage, in accordance with an embodiment of the present invention.

FIG. 3 is a flow chart that schematically illustrates a method for redundant data storage, carried out by SSD controller 36, in accordance with an embodiment of the present invention. In this example, the data items comprise data pages that are stored in Flash memory 28. For each parity group, a parity data page (comprising a bitwise XOR over the data pages in the group) is stored in RAM 32.

The method begins with processor 48 accepting from host 24 via host interface 40 a data page for storage in the SSD, at an input step 70. Processor 48 reads the previous copy of this data page from Flash memory 28, at an old data readout step 74. Processor 48 reads from RAM 32 the parity page of the parity group to which the data page belongs, at a parity readout step 78.

Processor 48 calculates updated redundancy information for the parity group, which reflects the changes between the old copy of the data page and the new data page, at a parity updating step 82. Processor 48 updates the parity page of the parity group by:

(i) Performing bitwise XOR between the old copy of the data page (read from Flash memory 28 at step 74) and the new copy of the data page (accepted from the host at step 70); and (ii) Performing bitwise XOR between the XOR result above and the existing parity page (read at step 78).

Processor 48 then stores the updated parity page in RAM 32, at a parity storage step 86. The new parity page is typically stored in-place, i.e., replaces the old parity page in the same storage location in RAM 32. Processor 48 stores the new copy of the data page in Flash memory 28, at a data page storage step 90.

At the end of this process, the new data page is stored in Flash memory 28, and the parity page of the data page's parity group is updated in RAM 32. The flow of FIG. 3 is an example flow, and any other suitable flow can be used in alternative embodiments. For example, the two XOR operations at step 82 can be replaced with a single XOR operation among the old data page, the new data page and the parity page. As another example, the order of steps in FIG. 2 may be modified.

Figure 4:
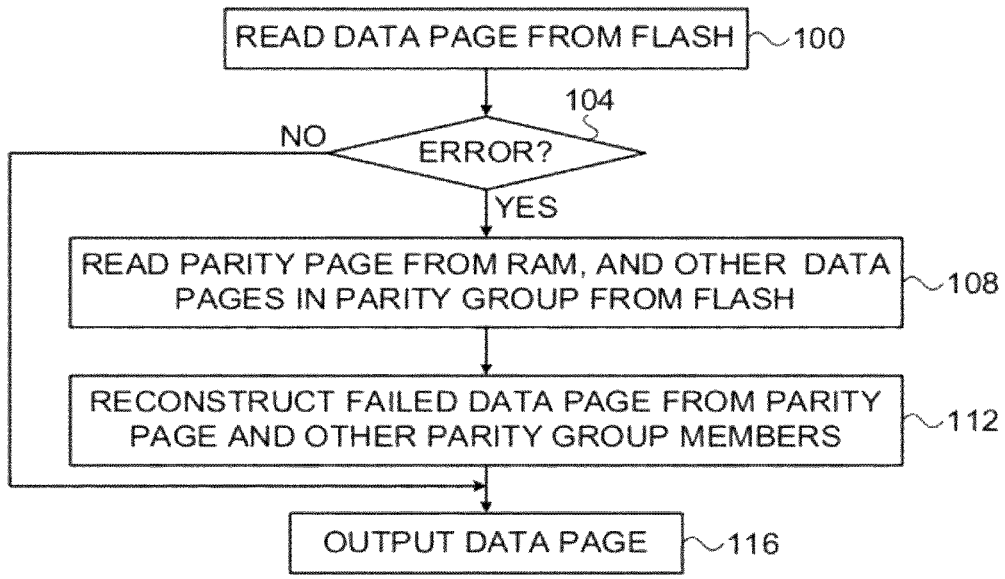
FIG. 4 is a flow chart that schematically illustrates a method for retrieving data that was stored using the method of FIG. 3, in accordance with an embodiment of the present invention.

FIG. 4 is a flow chart that schematically illustrates a method for retrieving data that was stored using the method of FIG. 3, carried out by SSD controller in accordance with an embodiment of the present invention. The method begins with processor 48 reading a data page from Flash memory 28 via interface 44, at a readout step 100, e.g., in response to a request from host 24.

Processor 48 checks whether the data page was read successfully or erroneously, at a checking step 104. If the data page was read erroneously, processor 48 restores the data page using the redundant storage scheme: The processor reads the parity page of the parity group to which the data page belongs from RAM 32, and also reads the remaining data pages in the parity group from Flash memory 28, at a parity and group readout step 108.

Using the parity page and the remaining data pages in the parity group, processor 48 reconstructs the failed data page, at a reconstruction step 112. Typically, processor 48 calculates a bitwise XOR over the parity page and the remaining data pages in the parity group, to produce the reconstructed data page.

Processor 48 then outputs the reconstructed data page to host 24 over interface 40, at an output step 116. If checking step 104 above concludes that the data page was read successfully from Flash memory 28, the method branches directly to output step 116 and skips steps 108 and 112. The flow of FIG. 4 is an example flow, and any other suitable flow can be used in alternative embodiments.

In the examples of FIGS. 3 and 4 above, each parity group comprises a single parity page that is computed over the data pages in the group. In alternative embodiments, however, a parity group may comprise more than one parity page. Multiple parity pages per group may be used, for example, in redundant storage schemes that protect from failure of more than one data page. In such schemes, additional read and XOR operations may be needed.

Protecting the Redundancy Information from Electrical Power Loss

Since the redundancy information is stored in volatile memory (RAM 32 in the present example), it may be lost if the electrical power supply to SSD 20 is interrupted. In some embodiments, SSD 20 protects the redundancy information in the RAM from electrical power interruption.

In an example embodiment, the SSD comprises a backup electrical power source (not shown in the figures) that provides temporary power supply to RAM 32 in case the main power supply to SSD 20 is interrupted. The backup power source may comprise, for example, a battery, a capacitor or any other suitable type of power source. In one embodiment, when the main power supply is interrupted, processor 48 copies the redundancy information from RAM 32 to a designated area in Flash memory 28. The backup power source is typically designed to have sufficient energy for powering the RAM and associated circuitry (e.g., the entire SSD controller) until the copy operation is complete.

In another embodiment, processor 48 receives an advance notification from host 24 that main power interruption is imminent. During the time period between the notification and the power interruption, processor 48 copies the redundancy information from RAM 32 to Flash memory 28. In either embodiment, when the main power supply to SSD 20 is resumed, processor 48 may copy the redundancy information back from Flash memory 28 to RAM 32.

In some embodiments, processor 48 protects the redundancy information stored in RAM 32 against data storage errors and failures that may occur in the volatile memory. This protection is typically additional to and separate from the redundant storage scheme that produces the redundancy information in the first place. Any suitable protection scheme, such as a XOR-based scheme or a suitable ECC, can be used for this purpose. When using such a protection scheme, processor 48 typically calculates parity bits over the redundancy information, and stores the parity bits in RAM 32. When retrieving redundancy information as part of the redundant storage scheme, processor 48 typically uses the corresponding parity bits to correct errors that may have occurred in the redundancy information due to storage in the RAM.

Although the embodiments described herein refer mainly to schemes in which each data item belongs to a single parity group, in alternative embodiments a given data item may belong to multiple parity groups, and participate in the redundancy information of these multiple parity groups.

Consider, for example, an LDPC code in which every bit or symbol appears in several parity equations, and every parity equation is defined over several bits or symbols. A configuration of this sort can be used for protection from read failures, by making every data item (data page in this example) belong to two or more parity groups (and thus participate in the calculation of two or more parity pages). When read failure occurs in a given data page, processor 48 reads the parity pages and the data pages of the parity groups of the failed data page, and uses an ECC decoder to improve the decoding probability. Such a scheme can improve the level of protection, at the possible expense of complexity, power consumption and decoding time.

Although the embodiments described herein refer mainly to a relatively simple RAID scheme. The disclosed techniques, however, are not limited to any particular redundant storage schemes, and can be used with any suitable redundant storage scheme such as higher-complexity RAID schemes.

In the embodiments described herein, the volatile memory used for storing the parity information is part of the storage device (e.g., RAM 32 in SSD 20). In alternative embodiments, however, the volatile memory may be remote or generally external to the storage device. In an example embodiment, the volatile memory comprises a memory of host 24. Processor 48 may communicate with the volatile memory using any suitable interface, for example using the same interface used for communication between the host and the memory controller. The external volatile memory in these embodiments may or may not be protected from power interruption, for example using one of the protection schemes described above.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
storing two or more data items in a non-volatile memory comprising a plurality of non-volatile memory devices, wherein storing the two or more data items comprises storing data items in parity groups such that a number of data items stored on each non-volatile memory device within a given parity group is limited to a predetermined number;
calculating redundancy information over the data items, and storing the redundancy information in a volatile memory; and
upon a failure to retrieve a data item from the non-volatile memory, reconstructing the data item from remaining data items stored in the non-volatile memory and from the redundancy information stored in the volatile memory.

2. The method according to claim 1, wherein calculating the redundancy information comprises calculating an exclusive-OR (XOR) over the data items, and wherein reconstructing the data item comprises calculating the XOR over the remaining data items and the redundancy information.

3. The method according to claim 1, wherein calculating the redundancy information comprises encoding the data items with an Error Correction Code (ECC).

4. The method according to claim 1, wherein the data items are defined by respective physical storage locations in the non-volatile memory.

5. The method according to claim 1, wherein the data items are defined by respective logical addresses that are mapped to respective physical storage locations in the non-volatile memory in accordance with a logical-to-physical address translation scheme.

6. The method according to claim 1, wherein storing the redundancy information comprises protecting the redundancy information stored in the volatile memory from interruption of electrical power supply.

7. The method according to claim 6, wherein protecting the redundancy information comprises providing the electrical power supply to the volatile memory from a backup power source during at least part of the interruption.

8. The method according to claim 6, wherein protecting the redundancy information comprises receiving an advance notification of the interruption, and initiating protection of the redundancy information in response to the notification.

9. The method according to claim 6, wherein protecting the redundancy information comprises copying the redundancy information from the volatile memory to the non-volatile memory.

10. The method according to claim 1, wherein calculating the redundancy information comprises calculating first redundancy information over a first set of the data items, and calculating second redundancy information over a second set of the data items, such that a given data item belongs to both the first set and the second set, and wherein reconstructing the given data item comprises recovering the given data item using both the first and the second redundancy information.

11. The method according to claim 1, wherein storing the data items comprises distributing the data items over multiple non-volatile memory devices such that no more than two items per parity group are stored in each non-volatile memory device.

12. The method according to claim 1, wherein the volatile memory is external to a storage device that comprises the non-volatile memory.

13. The method according to claim 1, wherein storing the redundancy information comprises calculating parity bits over the redundancy information, and storing both the parity bits and the redundancy information in the volatile memory.

14. A data storage apparatus, comprising:
a non-volatile memory comprising a plurality of non-volatile memory devices; and
a processor configured to store two or more data items in the non-volatile memory in parity groups such that a number of data items stored on each non-volatile memory device within a given parity group is limited to a predetermined number, and further configured to calculate redundancy information over the data items, to store the redundancy information in a volatile memory, and, upon a failure to retrieve a data item from the non-volatile memory, to reconstruct the data item from remaining data items stored in the non-volatile memory and from the redundancy information stored in the volatile memory.

15. The apparatus according to claim 14, wherein the processor is configured to calculate the redundancy information by calculating an exclusive-OR (XOR) over the data items, and to reconstruct the data item by calculating the XOR over the remaining data items and the redundancy information.

16. The apparatus according to claim 14, wherein the processor is configured to calculate the redundancy information by encoding the data items with an Error Correction Code (ECC).

17. The apparatus according to claim 14, wherein the data items are defined by respective physical storage locations in the non-volatile memory.

18. The apparatus according to claim 14, wherein the data items are defined by respective logical addresses that are mapped to respective physical storage locations in the non-volatile memory in accordance with a logical-to-physical address translation scheme.

19. The apparatus according to claim 14, wherein the processor is configured to protect the redundancy information stored in the volatile memory from interruption of electrical power supply.

20. The apparatus according to claim 19, and comprising a backup power source, which is configured to provide the electrical power supply to the volatile memory during at least part of the interruption.

21. The apparatus according to claim 19, wherein the processor is configured to receive an advance notification of the interruption, and to initiate protection of the redundancy information in response to the notification.

22. The apparatus according to claim 19, wherein the processor is configured to protect the redundancy information by copying the redundancy information from the volatile memory to the non-volatile memory.

23. The apparatus according to claim 14, wherein the processor is configured to calculate first redundancy information over a first set of the data items, and to calculate second redundancy information over a second set of the data items, such that a given data item belongs to both the first set and the second set, and to reconstruct the given data item using both the first and the second redundancy information.

24. The apparatus according to claim 14, wherein the processor is configured to distribute the data items over multiple non-volatile memory devices such that no more than two items per parity group are stored in each non-volatile memory device.

25. The apparatus according to claim 14, wherein the volatile memory is external to the data storage apparatus.

26. The apparatus according to claim 14, wherein the processor is configured to calculate parity bits over the redundancy information, and to store both the parity bits and the redundancy information in the volatile memory.

27. A memory controller, comprising:
an interface for communicating with a non-volatile memory comprises of a plurality of non-volatile memory devices; and
a processor configured to store two or more data items in the non-volatile memory in parity groups such that a number of data items stored on each non-volatile memory device within a given parity group is limited to a predetermined number, and further configured to calculate redundancy information over the data items, to store the redundancy information in a volatile memory, and, upon a failure to retrieve a data item from the non-volatile memory, to reconstruct the data item from remaining data items stored in the non-volatile memory and from the redundancy information stored in the volatile memory.

* * * * *

UNITED STATES PATENT AND TRADEMARK OFFICE
CERTIFICATE OF CORRECTION

PATENT NO. : 9,058,288 B2  
APPLICATION NO. : 13/429385  
DATED : June 16, 2015  
INVENTOR(S) : Oren Golov et al.

Page 1 of 1

It is certified that error appears in the above-identified patent and that said Letters Patent is hereby corrected as shown below:

In the Claims:

Claim 27, Column 12, Line 19, please delete "comprises" and substitute -- comprising --

Signed and Sealed this
Twenty-seventh Day of October, 2015

Michelle K. Lee
*Director of the United States Patent and Trademark Office*